Patented Oct. 12, 1943

2,331,804

UNITED STATES PATENT OFFICE 2,331,804

METHOD OF PACKING FRUIT PRODUCTS

Karl J. Seulke, Decatur, Ill., assignor to A. E. Staley Manufacturing Company, Decatur, Ill., a corporation of Delaware No Drawing. Application October 5, 1940, Serial No. 359,907

5 Claims. (Cl. 99—154)

The present invention relates to an improved method of packing and preserving fruit products, and has particular reference to the packing of such products in a manner to retard loss of flavor and color in the presence of sugar products with which the products are prepared.

It is customary to package fruit products such as frozen fruits in barrels in the presence of syrups or sugar. Other fruit products such as candied fruits merely are treated with a sweetening agent without being packed in a liquid syrup. Still other fruit products such as jams and jellies are prepared by coagulating the material of which they are composed to incorporate the fruit flavor in the jellied mass. In each of these instances considerable difficulty is encountered in retaining the fruit flavor of the products as well as the color.

A principal object of the present invention is the preparation of fruit products of the type described by treatment with a particular type of starch conversion syrup having syneresis and osmotic characteristics which provide a preservative action on the color, taste and texture of the fruit products.

Another object of the invention is the preservation of fruit products by preparation in the presence of a syrup which has been produced by combined acid and enzyme hydrolysis of starch in the manner described in Patent No. 2,201,609, issued May 21, 1940.

These and other objects will be observed upon consideration of the following description of a preferred embodiment of the invention.

The technique involved in preparing various fruit products may differ quite widely, but a general characteristic is that the products are combined with some type of sweetening agent. Thus, most fruits generally are packed in barrels in a sugar syrup. Candied and glazed fruits are treated with sugar or syrup and are left as dry as possible. Canned fruits are packed in syrup.

In the practice heretofore the syrups and sugar products principally used in packing these various fruit products are based on sucrose or cane and beet sugars, although dextrose is used to some extent.

A difficulty which has been encountered in the use of ordinary sugar products is that they cause a loss of flavor and color from the fruit product. That is, the flavor and color of the product tend to leave the fruit product itself to be taken up by the syrup or sugar. In the case of all types of fruit products this loss of flavor and color may be exhibited by a bleed.

The present invention is based on the discovery that the type of syrup described in Patent No. 2,201,609 may be used in the preparation of these fruit products without such a loss of flavor and color.

The syrup is prepared by subjecting starch to acid hydrolysis in the manner customary in the production of confectioner's glucose to provide a syrup having a dextrose equivalent content of more than 25 per cent and preferably of the order of 40 to 55 per cent. Thereafter the acid conversion liquor is brought to the proper concentration and temperature for enzyme hydrolysis and a quantity of a suitable enzyme obtained from fungus is added to the syrup to bring the dextrose equivalent content of the syrup to between about 60 and 75 per cent. In the acid hydrolysis care is taken to prevent the formation of unpleasant hydrol taste such as would be produced if the hydrolysis is carried much further than 55 to 60 per cent.

The syrup resulting from the enzyme conversion will have a dextrose equivalent analysis of between about 55 and 75 per cent, a dextrose content of more than 20 per cent, a maltose content of between 20 and 27 per cent, a fermentable extract content of more than 55 per cent, a ratio of fermentable extract to dextrose equivalent of between 0.9 and 1.2, and a specific rotation of between about 135 and 100. It is preferred to utilize a syrup of this character having a ratio of fermentable extract content to dextrose equivalent content not exceeding 1.1. The syrup is sweet tasting and when of a density corresponding to 43° Baumé at 95° F. will have a viscosity of between 100 and 150 poises.

The particular procedure for the production of the syrup and its ordinary characteristics are described more particularly in Patent No. 2,201,609, to which reference has been made hereinbefore.

An unobvious characteristic of this syrup is that when used in connection with a fruit product the syrup tends to penetrate the product rather than to draw out the flavor and color-imparting constituents of the fruit product. Thus, when candied fruits are produced with the improved syrup the syrup impregnates the fruits to provide a preservation characteristic and a retention of the natural flavor and color of the fruit. When used in the production of jams and jellies this penetrating characteristic of the syrup retards the syneresis which is characteristic of similar products produced with confectioners glucose or cane and beet sugars.

In the use of the syrup with canned fruits the fruit will be found to retain its firmness, taste and color over a prolonged period. The syrup tends to penetrate the fruit rather than to draw out the flavor and taste-imparting constituents into the syrup.

The opposite results which are obtained by use of the acid-enzyme conversion syrup over the use of previous syrups and sugar products apparently are due to a difference in osmotic characteristics. In the cases of jams and jellies these different osmotic characteristics result in improved gel strength and reduction of the tendency toward syneresis. The product is of an improved smooth texture and high gloss, as well as of desirable spreading qualities.

Fruit butters made with the material have a highly desirable flavor, texture and color. These fruit butters are produced by pulping the fruit products to such an extent that the products are susceptible of loss of flavor and color by osmotic action, but when produced with the acid and enzyme conversion syrup the flavor and color apparently is pushed back into the product rather than extracted from it.

The acid-enzyme conversion syrup is not as sweet as sucrose, and in many cases where it is desired to add sweetness to the finished product a sufficient quantity of acid-enzyme syrup will be employed in connection with sucrose to give the desired preservation of flavor and color.

Where relatively dry fruit products such as candied fruits are produced with the acid-enzyme conversion syrup the syrup again tends to retain the flavor of the fruit in the product. Improved texture and preservation of taste and color result from this characteristic.

A further advantage of the use of an acid-enzyme conversion syrup in the preservation of fruit products of the type described is that the technique commonly employed in the manufacture of such products may be retained, merely by substitution of the acid-enzyme syrup for other types of sugar products formerly employed.

Various fungus enzymes may be employed for the further conversion of the acid hydrolyzed syrup. Among these suitable enzymes are *Aspergillus oryzae*, *Aspergillus flavus*, *Aspergillus niger*, *Aspergillus wentii*, *Monilia sitophila*, *Rhizopus nigricans*, and *Rhizopus tritici*.

It will be recognized that the procedure employed in packing fruit products in accordance with the present invention may be varied widely without departing from the scope of the appended claims.

I claim:

1. In the production of preserved fruit products, the improvement which comprises treating the fruit products with a syrup produced by the acid conversion of starch to provide a conversion liquor having a dextrose equivalent content of more than 25 per cent and the subsequent enzyme conversion of this liquor to the extent necessary to produce a syrup having a dextrose equivalent content of more than 55 per cent.

2. In the preservation of fruit, the improvement which comprises treating the fruit product with an acid-fungus enzyme starch conversion syrup having a dextrose equivalent analysis of between 55 and 75 per cent, a dextrose content of more than 20 per cent, a maltose content of more than 20 per cent, a fermentable extract content of more than 55 per cent, and a ratio of fermentable extract to dextrose equivalent of between 0.9 and 1.2.

3. In the preservation of fruit products, the improvement which comprises incorporating the fruit product in a syrup produced by the acid-fungus enzyme conversion of starch, said syrup having a dextrose equivalent analysis of between 55 and 75 per cent, a dextrose content of more than 20 per cent, a maltose content of more than 20 per cent, a fermentable extract content of more than 55 per cent, and a ratio of fermentable extract to dextrose equivalent of between 0.9 and 1.2.

4. In the production of canned fruits, the improvement which comprises preparing said fruit for canning by treatment thereof with an acid-fungus enzyme starch conversion syrup having a dextrose equivalent analysis from between 55 and 75 per cent, a dextrose content of more than 20 per cent, a maltose content of between 20 and 27 per cent, a fermentable extract content of more than 55 per cent, and a ratio of fermentable extract content to dextrose equivalent content not exceeding 1.1.

5. In the preparation of a canned fruit product, the improvement which comprises incorporating the fruit product in an acid-fungus enzyme syrup having a dextrose equivalent analysis of between 55 and 75 per cent, a dextrose content of more than 20 per cent, a maltose content of between 20 and 27 per cent, a fermentable extract content of more than 55 per cent, and a ratio of fermentable extract content to dextrose equivalent content not exceeding 1.1, said syrup being sweet tasting and having flavor and color-preserving osmotic characteristics.

KARL J. SEULKE.